(12) United States Patent
Mobin et al.

(10) Patent No.: US 8,687,682 B2
(45) Date of Patent: Apr. 1, 2014

(54) TRANSMITTER ADAPTATION LOOP USING ADJUSTABLE GAIN AND CONVERGENCE DETECTION

(75) Inventors: Mohammad Mobin, Orefield, PA (US); Amaresh Malipatil, San Jose, CA (US); Adam Healey, Newburyport, MA (US); Ye Liu, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 137 days.

(21) Appl. No.: 13/360,978

(22) Filed: Jan. 30, 2012

(65) Prior Publication Data

US 2013/0195154 A1     Aug. 1, 2013

(51) Int. Cl.
*H03K 5/159* (2006.01)
*H04B 1/10* (2006.01)

(52) U.S. Cl.
USPC ............................................. 375/232; 375/350

(58) Field of Classification Search
USPC ........................... 375/219, 232, 233, 316, 350
See application file for complete search history.

(56) References Cited

U.S. PATENT DOCUMENTS

| | | | |
|---|---|---|---|
| 5,978,473 A | 11/1999 | Rasmusson | |
| 7,016,406 B1 | 3/2006 | Phanse et al. | |
| 7,440,497 B2 | 10/2008 | Balan et al. | |
| 7,599,461 B2 | 10/2009 | Aziz et al. | |
| 7,616,686 B2 | 11/2009 | Aziz et al. | |
| 7,636,408 B2 | 12/2009 | Bau et al. | |
| 2004/0086275 A1* | 5/2004 | Lenosky et al. | 398/39 |
| 2005/0003766 A1* | 1/2005 | Chen | 455/67.11 |
| 2010/0061488 A1* | 3/2010 | Endres et al. | 375/326 |
| 2012/0183098 A1* | 7/2012 | Choi et al. | 375/296 |
| 2013/0115903 A1* | 5/2013 | Kroeger et al. | 455/193.1 |
| 2013/0176154 A1* | 7/2013 | Bonaccio et al. | 341/118 |

OTHER PUBLICATIONS

Ying Tan, Dragan Nesic, Iven Mareels; On the choice of dither in extremum seeking systems: A case study: www.sciencedirect.com; http://www.elsevier.com/locate/automatica; Mar. 4, 2008; Automatica 44 (2008) 1446-1450; The Department of Electrical & Electronics Engineering, The University of Melbourne, Melbourne, VIC 3010, Australia.

D.A. Johns, W.M. Snelgrove, A.S. Sedra; Continuous-Time LMS Adaptive Recursive Filters; Trans. on CAS; Feb. 11, 1991.

Anthony Tong, Paul J. Hurst; A Mixed-Signal Approach for Tuning Continuous-Time Low-Pass Filters; Solid State Circuits Research Laboratory; Department of Electrical and Computer Engineering. University of California; Nov. 19, 2003.

* cited by examiner

*Primary Examiner* — Don N Vo

(57) ABSTRACT

A communication port and method of adapting a transmit filter in the port to reduce receive errors by a receiver coupled to the transmit filter via a communication channel. The filter has coefficients that are adjusted in response to a first adaptation gain value, decision bits, and receiver error values. During a first time period, the coefficients are adjusted until changes in the coefficients are less than a first threshold amount. Then during a second time period, the coefficients are adjusted using a second adaptation gain value until changes in the coefficients are less than a second threshold amount. The second adaptation gain value is less than the first adaptation gain value and the second threshold amount being less than the first threshold amount. By using two or more adjustment periods with different gain values, the filter is adapted faster than using a single adjustment period with fixed adaptation gain.

48 Claims, 5 Drawing Sheets

FIG. 4

| STEP | ADAPTATION LOOP GAIN α | WINDOW WIDTH | WINDOW HEIGHT | COMMENT |
|---|---|---|---|---|
| 1 | α1 | T1 | H1 | ACQUISITION SETTINGS |
| 2 | α2 (α2 < α1) | T2 (T2 < T1) | H2 (H2 < H1) | INTERMEDIATE |
| 3 | α3 (α3 < α2) | T3 (T3 ≤ T2) | H3 (H3 < H2) | MINIMUM WINDOW, GAIN |

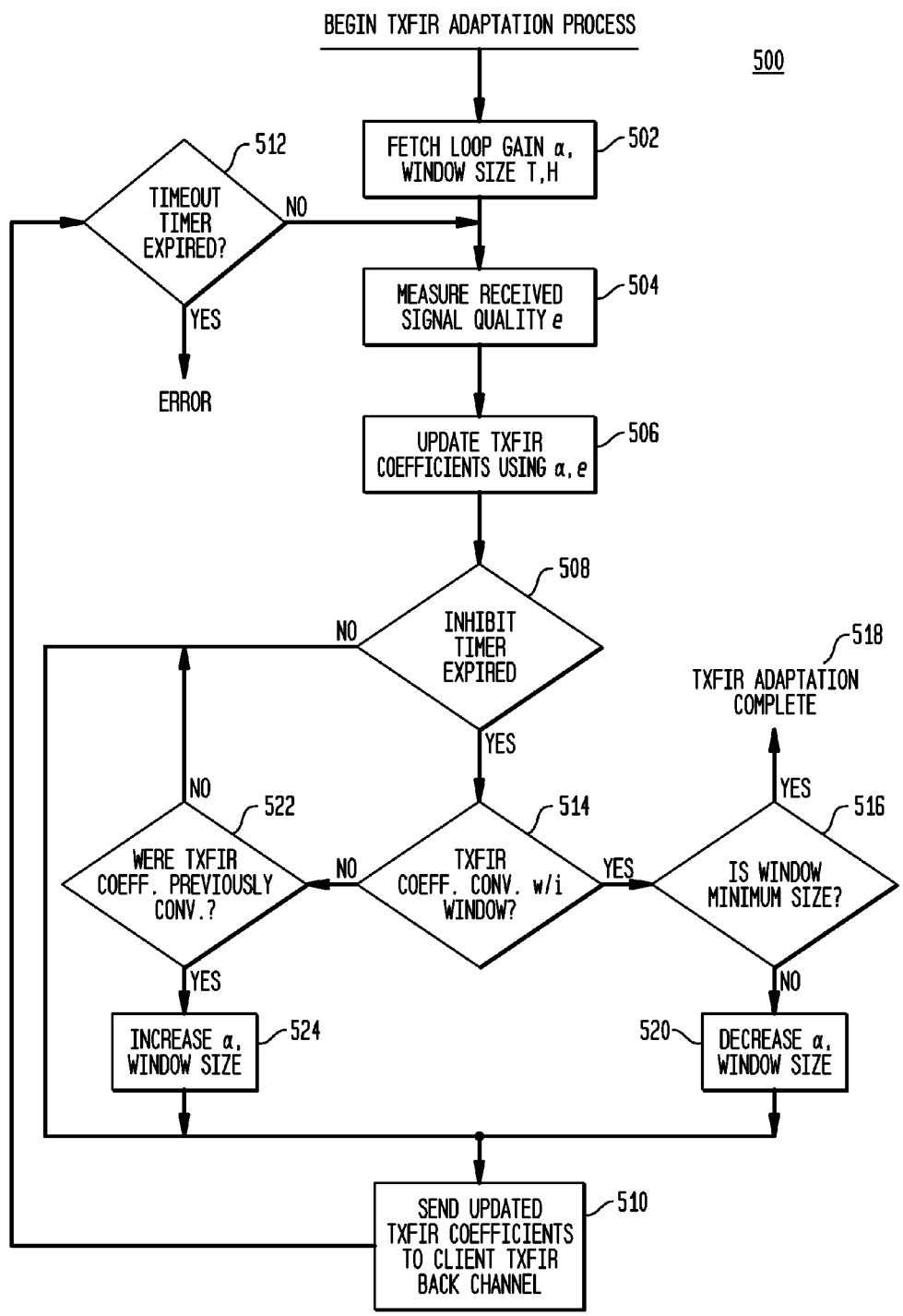

TRANSMITTER ADAPTATION LOOP USING ADJUSTABLE GAIN AND CONVERGENCE DETECTION

BACKGROUND

Multi-gigabit per second (Gbps) communication between various chips or "ports" on a circuit board or modules on a backplane has been in use for quite a while. Data transmission is usually from a transmitter that serializes parallel data for transmission over a communication media, such as twisted pair conductors as a cable or embedded in a backplane, fiber optic cable, or coaxial cable(s), to a receiver that recovers the transmitted data and deserializes the data into parallel form. However, data transmission greater than 8 Gbps over communication paths has been difficult to achieve because various signal impairments, such as intersymbol interference (ISI), crosstalk, echo, and other noise, can corrupt the received data signal to such an extent that a receiver is unable to recover the transmitted data at the desired high data rate with an acceptable level of error performance.

Various techniques are employed to improve the performance of the receiver. One technique is to provide the receiver in a port with a variable gain amplifier to assure signal linearity within a desired dynamic range, a multi-band adjustable analog (linear) equalizer to compensate for frequency-dependent losses, and an adjustable decision feedback equalizer to compensate for interference cancellation and other non-linear distortions of the channel. Even though the quality (e.g., the amount of "eye opening") of the received signal can be improved by the AFE, the complexity of the AFE needed to handle different serial communication protocols (e.g., PCIe Gen3, SAS-3, 16GFC, and 10GBASE-KR, all of which are included herein by reference in their entirety) over communication channels ranging from short, highly reflective channels to long-span channels with a poor insertion loss-to-crosstalk ratio (ICR) may be too complicated to implement cost effectively. Further, the amount of frequency-dependent distortion and interference may exceed the capability of the AFE such that it cannot fully correct for them, resulting in unacceptably poor performance.

One way to improve the quality of the received signal is for the signal transmitter, located in a port coupled to the port with the receiver, to drive the channel with signals that have been pre-distorted by a filter. One such filter used to pre-distort the transmitted signal is a finite-impulse response (FIR) filter with adjustable coefficients or taps, referred to herein as a TXFIR filter. For lower speed applications, the filter coefficients might be predetermined, i.e., selected from a set of preset coefficients, based on the design of the channel and the protocol being implemented. However, with the need for high-speed (e.g., 8 Gbps and above) applications, using a fixed set of coefficients has not worked well for all transmitter/channel/receiver implementations. Even similar implementations may require significantly different TXFIR coefficient values for proper operation due to chip-to-chip electrical parameter variations of the integrated circuits embodying the transmitter and the receiver and the electrical characteristics of the channel media as well.

The standards bodies that administer the various serial communication protocols mentioned above recognized the shortcomings of using fixed TXFIR coefficients and provided in the protocols a feedback mechanism utilizing a back-channel to allow for adjustment of the TXFIR coefficients during initialization of the transmitter and receiver. The protocols allow for the receiver to adapt the TXFIR coefficients by receiving a known data pattern from the transmitter and communicating new coefficient values to the transmitter via the back-channel until a time limit has been reached. Once the time limit has expired, the receiver determines if one or more performance metrics have been met, e.g., eye opening, bit error rate, jitter characteristics, etc. If the performance metrics are not met, then the receiver forces the transmitter to fall back or "down shift" to a slower speed protocol that might also require TXFIR adaptation. If the criteria are met, then the receiver begins other time-consuming initialization processes or begins normal operation. Unfortunately, the time limit for the various protocols can be unnecessarily long (e.g., 24 milliseconds (ms) for PCIe Gen3 and 500 ms for 10GBASE-KR) if successful adaptation occurs well before the time limit expires. The unnecessary adaptation time can cause significant, undesirable delay before normal communication operation begins, particularly when multiple adaptation attempts are made.

Therefore, it is desirable to provide a receiver that can quickly adapt the TXFIR coefficients and determine if the coefficient values have converged to values to allow for the receiver to terminate the adaptation process during initialization before the protocol-specified time period expires, thereby shortening the initialization period of the transmitter and the receiver.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

One embodiment of the invention is a port for receiving serialized data from a transmitter having a filter with at least one adjustable coefficient, the at least one adjustable coefficient having a value. The port has a receiver adapted to receive the filtered serialized data from the transmitter and generate decision bits and error values, a controller coupled to the receiver, and a back-channel transmitter coupled to the controller. The decision bits are a delayed version of the known data pattern and time-aligned with the error values. The error values are generated in response to the received serialized data. The controller is adapted to a) receive the error values from the receiver; b) adjust the value of the at least one coefficient by an amount based on an adaptation gain value, the decision bits, and the error values; c) transmit the value of the at least one adjusted coefficient to the filter via the back-channel transmitter. The controller repeats steps a) through c) for a first time period using a first adaptation gain value until changes in the at least one coefficient adjusted in b) is less than a first threshold amount. Then the controller repeats steps a) through c) for a second time period using a second adaptation gain value that is less than the first adaptation gain value until changes in the value of the at least one coefficient adjusted in b) is less than a second threshold amount, the second threshold amount being less than the first threshold amount.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 4 is a table used to set loop gain and convergence window sizes according to one embodiment of the invention; and FIG. 5 is a flowchart of the process of adapting transmit filter coefficients using back-channel communication as illustrated in FIG. 3 according to one embodiment of the invention.

DETAILED DESCRIPTION

As data rates increase for serializer/deserializer (SERDES) communications applications, the "quality" of the channel media degrades dramatically even over short distances between the ends of the channel. One technique typically used to overcome the poor quality channel and achieve the desired channel performance needed for reliable communications over the degraded channel is to pre-distort the transmitted signal to counteract the effects of the channel on the signal presented to the receiver. For high-speed signaling applications, such as 8 Gbps and faster SERDES applications, the pre-distortion characteristics are adjusted through a back or reverse channel to adapt the pre-distortion to the channel's characteristics.

Figure 1:
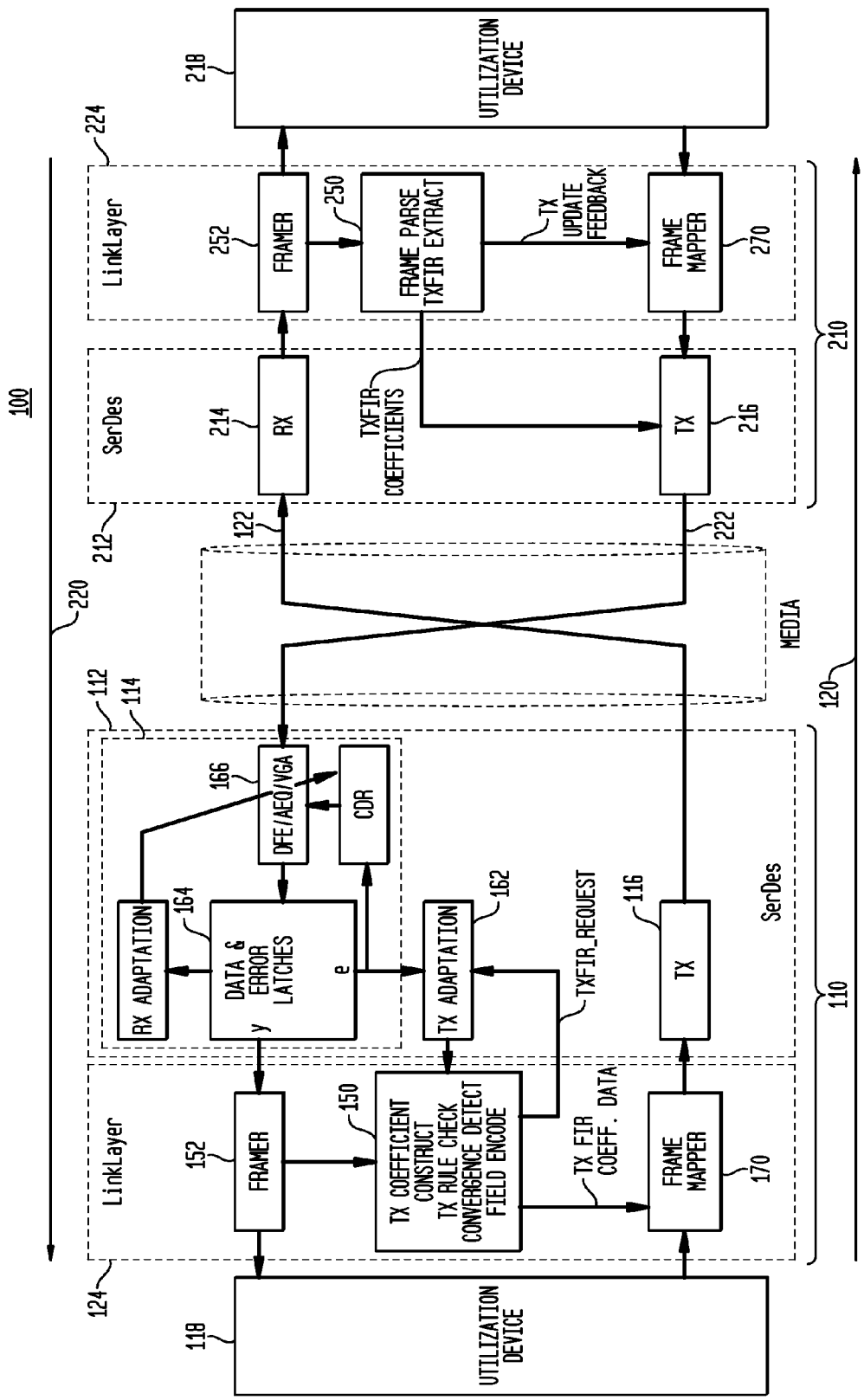
FIG. 1 is a simplified block diagram of a bidirectional communication system having a local port and a link partner port.

FIG. 1 is a block diagram of a typical bidirectional communication system 100 that incorporates two ports connected by channel media. One port is referred to herein as a local port 110 and the other as a link partner port 210, also referred to in various standards as downstream and upstream ports, respectively. The local port 110 controls the link partner port 210 through the use of special data frames. Both ports have a link layer and a serializer-deserializer (SERDES). The link layer is a well-known function (layer two of the seven layer International Organization for Standardization's Open System Interconnection communications system model) that provides the interface between a utilization device that sinks and sources data, and the SERDES. The link layer implements the protocol of the standard being used. The SERDES converts parallel data to serial data and vice-versa for transmission over channel media, such as but not limited to a backplane, metal traces in a substrate, a cable, or a combination thereof.

For purposes here, both ports contain substantially the same functional blocks so that the description herein of functional blocks in one port is applicable to the other port. However, it is understood that ports of different capability, e.g., communication speed, can be used to communicate with each other but might be lacking certain features, e.g., a transmit filter with variable coefficients or a receiver without an analog equalizer.

In the local port 110, the SERDES 112 has a receiver portion 114 and a transmitter portion 116. The SERDES 212 in the link partner port 210 has a receiver portion 214 and transmitter portion 216. The transmitter 116 sends serialized data from a data source in utilization device 118 to the receiver 214 via the aforementioned channel media 122 for delivery to a data sink in the utilization device 218, forming a communication channel 120. Similarly, the transmitter 216 sends serialized data from a data source in utilization device 218 to the receiver 114 via the aforementioned channel media 222 for delivery to a data sink in the utilization device 118, forming a communication channel 220. A utilization device might be a computer, a field-programmable gate array, a storage system, another communication system, or any other device that produces or consumes data. For purposes of this description, a communication channel is a main channel when the channel is carrying either data from one utilization device to another or conveying data during training as will be explained in more detail below, or the communication channel is a back-channel when conveying information regarding the setup, adaptation, or other data related to the operation of the main channel. A channel might be both a main channel and a back-channel during normal operation; e.g., channel 120 might be conveying data from utilization device 118 to utilization device 218 while conveying configuration or performance information (e.g., bit error rate) about the channel 220 to a controller located in the local port 110.

Figure 2:
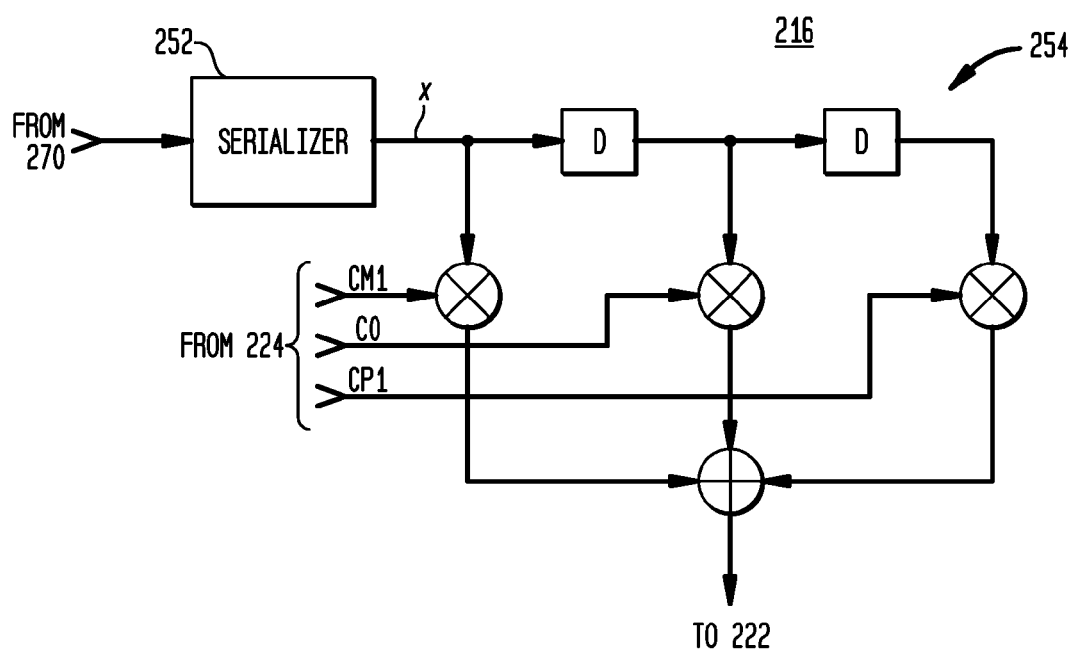
FIG. 2 is a simplified block diagram of an exemplary implementation of the transmitter portion of the ports in FIG. 1.

As will be explained in more detail in relation to FIG. 2, the transmitters 116, 216 each contain a serializer that converts parallel data from the respective link layer into serial data that is filtered by a transmit filter with adjustable coefficients, and the filtered serial data is driven onto the respective communication media. The receivers 112, 212 might be of the type disclosed in U.S. Pat. No. 7,616,686, incorporated by reference herein in its entirety. Simply put, when instructed to do so a receiver adapts to received data by recursively adjusting the equalizers therein (analog and digital if present) to minimize the error values related to the difference between transmitted data and data decoded by the receiver. The error values represents the quality of signals passing through the communication channel, including all equalizers and filters that the signal passes through. As will be explained in more detail below, the error values from a receiver is also used as input to a process that adapts the transmit filter of the transmitter coupled to the receiver via the respective communication media to further improve the performance of the system 100.

As mentioned above, data to be transmitted is filtered through a transmit filter disposed between a serializer and the communication media to improve the performance of the system 100 by pre-distorting the signals applied to the conductors in the channel media. FIG. 2 diagrams the details of an exemplary embodiment of the transmit portion of the SERDES 212, here a serializer 252 and an FIR (TXFIR) filter 254. In this embodiment, the a frame mapper 270 in link layer 224 (FIG. 1) drives the serializer 252 that in turn drives the TXFIR filter 254. The TXFIR filter 254 has three coefficients, C0, CM1, and CP1, referred to herein as the main cursor, pre-cursor, and post-cursor, respectively. As described in more detail below, a recursive adaptation algorithm performed in the local port 110 determines the values of the three TXFIR coefficients and these values are transmitted to the port 210 via channel 120 acting as a back-channel and are then loaded into the TXFIR 254 by the link layer 224. The recursive algorithm uses a signal related to the quality of a received signal having a decision-directed detected data pattern and iteratively adjusts the coefficients based on a filtered gradient of the received signal. An alternative exemplary TXFIR filter is disclosed in "A 1.0625-to-14.025 Gb/s Multimedia Transceiver with Full-rate Source-Series-Terminated Transmit Driver and Floating-Tap Decision-Feedback Equalizer in 40 nm CMOS" by Quan et al., Proceedings of the 2011 IEEE International Solid-State Circuits Conference, pp 348-349, incorporated by reference herein in its entirety. The coefficients of Quan's FIR filter might be adjusted as described for the TXFIR in FIG. 2. The above description of the transmitter 216 also applies to the transmitter 116 (FIG.

1). Similarly, the adaptation process described herein is equally applicable to adapting the TXFIR filter (not shown) in the SERDES 112.

When a request is made to adapt the coefficients of TXFIR filter 254, a controller 150 in the local port 110 sends a request for TXFIR adaptation, TXFIR_REQUEST, to transmit (TX) Adaptation unit 162 in the SERDES 112. While the TXFIR_REQEST signal is asserted and as will be explained in more detail in connection with FIG. 3, the TXFIR adaptation gradients for pre-cursor (CM1), main-cursor (C0), and post-cursor (CP1) are accumulated over a given period in the TX Adaptation unit 162 utilizing an error value, e, from the receiver 114. For purposes here and as will be explained in more detail in connection with FIG. 5, the error value e is a signal related to a difference between each data bits decoded by the receiver 114 (output y from data and error latches 164) and the signal received from the communication media 212 after being processed by the equalizers in block 166. During the time TXFIR_REQUEST is asserted, the receiver 114 can optionally adapt its variable gain amplifier (VGA), analog equalizer (AEQ), and the decision feedback equalizer (DFE) in block 166. Once the TXFIR_REQUEST signal is de-asserted the accumulated gradient for pre-cursor, post cursor, and the main cursor are evaluated. Based on the gradient evaluation results, the TXFIR coefficient updates will be determined by controller 150.

The ports 110, 210 process the TXFIR filter coefficient update information differently depending on the standard being implemented. In the aforementioned PCIe standard, the TXFIR filter coefficients are calculated following a certain set of rules (as explained in more detail below in connection with FIG. 5) and they are communicated to the link partner port 210 by encoding the transmitter coefficients in an outbound training sequence (TS1) order set frame in frame mapper 170 and sent via channel 120 operating as a back-channel. In the aforementioned SAS-3, 16GFC, and 10GBASE-KR standards, the coefficient increment or decrement information is encoded in the outbound coefficient update field of a training frame sent to the link partner port 210 via channel 120 operating as a back-channel. The controller 250 and framer 252 will parse the received transmitter update information and update the TXFIR coefficients in transmitter 216 provided the allowed range limit for the coefficients has not been reached. After an update has taken place, the link partner port 210 will provide feedback to the local port 110 through channel 220 using an outbound training frame that might have known training data therein. In PCIe standard, the updated transmitter coefficients will be broadcasted back in the above-mentioned TS1 order set. In SAS-3, 16GFC, and 10G-KR standards, the transmitter update feedback information will be encoded in the status report field of the training frame indicating a successful update, or no update yet, or the transmitter coefficient reached its range limit.

Once the new transmitter coefficients are activated in the TXFIR, the receiver 114 might readapt the VGA, AEQ, and DFE coefficients during a programmed amount of time while the TXFIR_REQUEST is de-asserted. After an appropriate amount of time is allocated for the receiver 114 to reacquire the change in dynamics of the transmitter 216 due to the TXFIR coefficient changes, the TXFIR_REQUEST might be reasserted to start another cycle of the link partner port transmitter adaptation. The lower bound of the TXFIR_REQUEST de-assertion time might be dictated by the greater of (a) summation of the (1) coefficient update information encoding delay in the local device, (2) two times the communication media delay, (3) coefficient information decode and provisioning delay in the link partner port 210, (4) the update feedback decoding delay in the local port 110, or (b) the time taken by the receiver 114 to readapt its VGA, AEQ, and DFE coefficients following the TXFIR coefficient update in accordance, for example, with the above-identified U.S. Pat. No. 7,616,686.

As will be explained in more detail in connection with FIG. 3, back-channel transmitter adaptation will end when the TXFIR coefficients have converged. Various convergence detection schemes can be employed for this purpose. If the convergence is not detected within the allocated time, the back-channel adaptation will end with a timeout established by a timer TIMEOUT_TIMER. In accordance with the aforementioned PCIe standard, the maximum allocated back-channel adaptation time is limited to 24 ms, while in the aforementioned SAS-3, 16GFC, and 10G-KR standards, the time limit is 500 ms.

Figure 3:
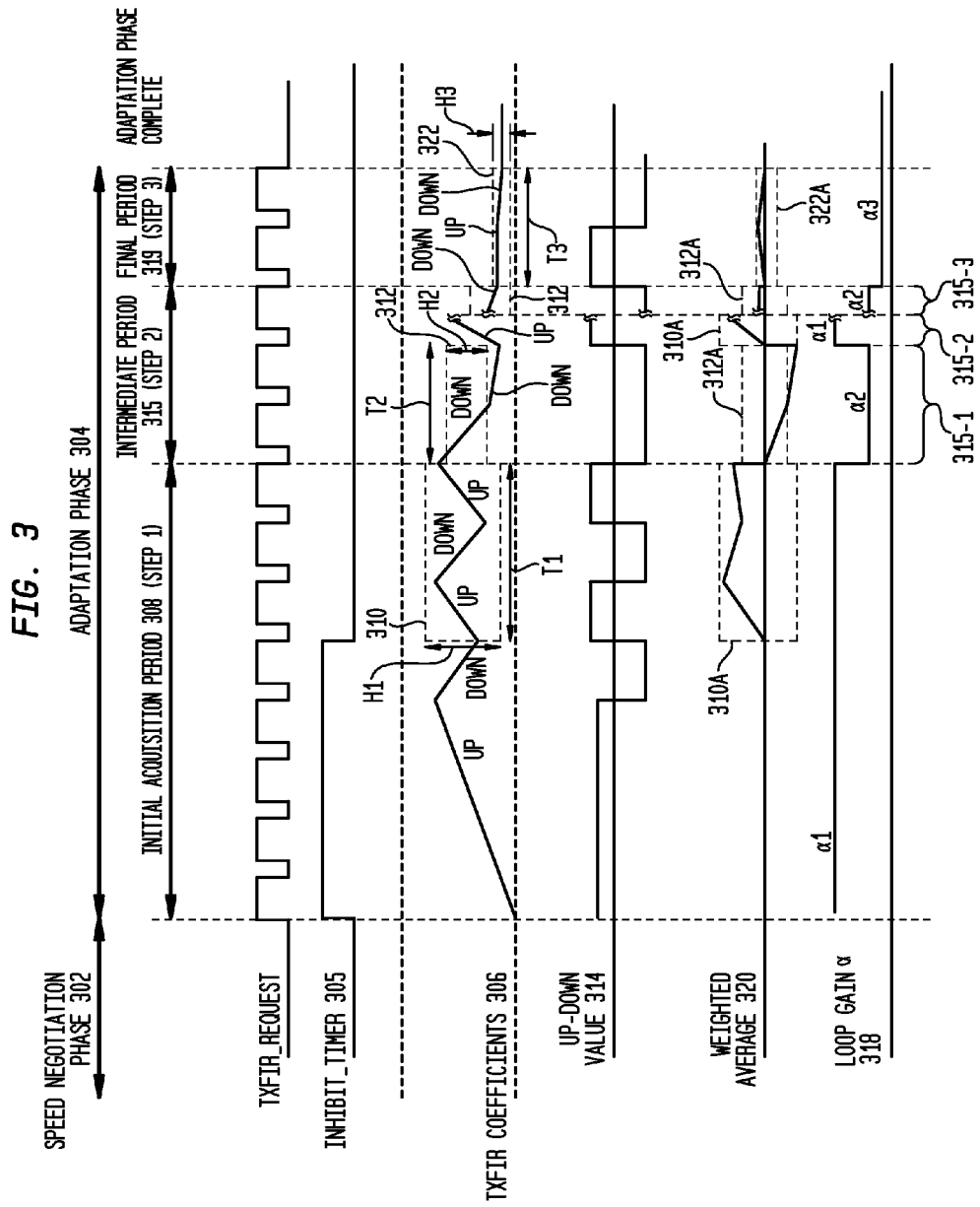
FIG. 3 is a simplified timing and signal diagram illustrating a transmit filter coefficient adaption process and illustrating techniques of detecting convergence of transmit filter coefficients according to alternative embodiments of the invention.

An exemplary operation of the adaptation process in accordance with the present invention is illustrated in FIG. 3. For purposes of this description, the operation is described in connection to the aforementioned PCIe standard but may be applied to any of the above-mentioned standards. Adaptation of the transmitter 116 can be done using the same process as described but for purposes of simplicity, adaptation of transmitter 216 is described herein.

Beginning in the speed negotiation phase 302, the local port 110 and the link partner port 210 (FIG. 1) negotiate with each other the speed of the channels 120 and 220. In essence, the ports negotiate the highest speed that the channels can communicate and is typically determined by the hardware limitations of the respective ports. Generally, phase 302 is accomplished using prearranged TXFIR coefficients or last used coefficients for the TXFIR filter 254 (FIG. 2) and the equalizers in block 166 of the receiver 114 (FIG. 1). An example of this can be found in the aforementioned PCIe standard regarding phases zero and one in the initialization process described therein. Reference may be made to the PCIe standard or any of the other aforementioned standards for a more complete understanding of the speed negotiation phase.

Once the speeds of the channels are set, an adaptation phase 304 is initiated in which the equalizers and filters in the ports adapt to each other and to the communication media 122, 222 such that the channels 120, 220 operate at high-speed with a low error-rate. In one embodiment, the adaptation phase 304 begins with the initial assertion of the TXFIR_REQUEST signal discussed above that initiates the beginning of the INHIBIT_TIMER 305 and begins adjustment of the TXFIR filter coefficients 306. The INHIBIT_TIMER 305 is used to guard against premature exit from transmitter adaptation that might happen due to training data pattern-dependent adaptation jitter or dither during an initial acquisition period 308 of the adaptation phase 304. A typical value for this timer is 10 ms or more but less than that of the TIMEOUT_TIMER discussed above. At the beginning of the adaptation phase 304 and in this example, the INHIBIT_TIMER timer is initialized and the output of the timer is asserted. As long as signal 305 is asserted, the below-described convergence criterion will not be applied to allow sufficient time for an initial transmitter coefficient adaptation to take place. Once convergence in the TXFIR coefficients 306 is detected using a "coarse" criteria described below, then the initial acquisition period 308 ends and a more refined criteria is used to determine if the adaptation phase 304 is complete.

In this embodiment, the controller 150 (FIG. 1) adjusts the TXFIR coefficients by increasing (UP) or decreasing (DOWN) the coefficients as described below. Also in this embodiment, the UP and DOWN signals 314 have a value of either a +1 or a −1, respectively, and are weighted (multiplied) by a loop gain value α (318) before being added to the coefficient values 306. As shown in FIG. 3, the TXFIR coefficient 306 is increased by α when UP is asserted and is decreased by α when DOWN is asserted. As described below, the weighted UP and DOWN values can be used in determining whether or not the TXFIR coefficients have converged. Other approaches to adjust the TXFIR coefficients may be used as desired.

A convergence evaluation window is used after the INHIBIT_TIMER is de-asserted to determine if the TXFIR coefficient 306 has converged. The size (height H, corresponding the threshold used for determining convergence, and temporal length or width T) of the first convergence evaluation window 310 is relatively large during period 308. In one exemplary embodiment, if the peak-to-peak TXFIR coefficient values 306 fall within the height of the window 310, then convergence is declared and the initial acquisition portion 308 ends. An intermediate phase 315 is begun using a new, less coarse window 312 that is smaller than the coarse initial window 310 e.g., H2<H1 and T2<T1), along with a new adaptation loop gain α2 that smaller than the adaptation loop gain α1. The new window and loop gain value is then used for the further refining the TXFIR coefficients. Generally, all of the TXFIR coefficient values should be within the window 310 for convergence. Thus, if all but one of the coefficient values is within the window then the initial acquisition portion 308 will continue until the other coefficients also converge.

Several techniques can be used to determine convergence, two of which are described here. As mentioned above, one technique is to track the peak-to-peak values of the TXFIR coefficient values 306 within an evaluation window so that the coefficients are deemed to have converged if the value of the coefficient does not exceed the window boundaries. An alternative technique utilizes separate accumulators (not shown) for each of the TXFIR coefficients 306, each accumulator separately accumulating or averaging the loop gain-weighted UP and DOWN correction values (as described above) during an evaluation window. Alternatively, each accumulator might separately accumulate non-weighted UP and DOWN correction values and set the window height accordingly. If by the end of the convergence window the averaged value has not exceeded the height (threshold) of the window, then the coefficient is deemed converged. In the example in FIG. 3, the accumulated loop gain-weighted values (320) for one of the TXFIR coefficients are illustrated with respect to an initial evaluation window 310A (corresponding to the window 310). At the end of the window 310A, the value of the weighted values does not exceed the window height and, thus, the TXFIR coefficient has converged. At the end of each evaluation window, the accumulated value 320 is reset to zero.

In this embodiment, the adaptation loop gain value 318 is largest during the acquisition period 308 and, generally, a smaller value or values are used during the remainder of the adaptation phase 304, resulting in generally smaller UP and DOWN values as the adaptation phase 304 progresses. Concomitantly with the changing of the loop gain 318, the size of the window is changed to have a smaller height or amplitude H and/or a shorter temporal length T as appropriate. For example, window 310 has a height H1 and length T1 and smaller window 312 has a height H2 and a length T2, T2<T1 and H2<H1. It is understood that, for example, the length of the window might not change (e.g., T1=T2) but the height is usually decreased as the window gets smaller. Because the relatively large UP and DOWN values during period 308 causing rapid changes in the coefficient values that might result in a local minima in the changes to the coefficient values, the probability of a false convergence is reduced by having the width T1 of the first window longer than the remaining windows.

A tabular example of the loop gain and window sizes can be found in FIG. 4, the values are stored in a memory or might be calculated dynamically. Here, in Step 1, the initial values (α1 and the size of window 310) for the acquisition period 308 is stored. Once the period 308 ends, then in Step 2 a new adaption loop gain α2 and window size, such as window 312, is used. Once convergence occurs using the values in Step 2, then values of a still smaller window (T3, H3) and a smaller adaptation loop gain α3 in Step 3 might be used. While three Steps are shown in FIG. 4 and are illustrated in FIG. 3, more Steps might be used as required.

Returning to FIG. 3, after the initial or acquisition period 308 ends, then an intermediate period 315 begins. In subperiod 315-1 a new window 312 is retrieved from Step 2 in the table in FIG. 4. The window 312 is used to determine if convergence occurs using smaller weighted UP and DOWN values changing the coefficient values because the new, smaller loop gain α2 being used to weight the UP and DOWN values 314. In this example, the TXFIR coefficient value 306 exceeds the window 312 and no convergence occurs, further evidenced by the accumulated weighted values 320 exceeding the height of window 312A. As will be described in more detail below regarding FIG. 5, since no convergence was detected, adaptation is again attempted but with the window and loop gain returning to the values of Step 1 as shown in sub-period 315-2. Assuming here convergence was achieved in sub-period 315-1, the window 312 and adaptation loop gain α2 is used in sub-period 315-3. Once convergence occurs using window 312 in sub-period 315-3, the intermediate period 315 ends and a new, final period 319 begins, using a new gain α3 and window 322 length (T3) and height (H3) as retrieved from Step 3 in the table in FIG. 4, the new window 322 having the same temporal length (T3=T2) as the window 312 but with a smaller height (H3<H2) than window 312, although a different length (e.g., T3<T2) might be used. When the coefficients 306 are within the window 322 and convergence is detected, the adaptation phase 304 is terminated. It is understood that additional gain and window size convergence Steps might be used. By using multiple loop gains and convergence windows, a faster convergence of the coefficient values might be accomplished than by using only one gain value α. Further, the described techniques allow for the possibility for an adaptation process that completes before the TIMEOUT_TIMER expires.

Referring to FIG. 5, the adaptation process 500 that occurs with each assertion of the TXFIR_REQUEST signal in FIG. 3 is shown in a flowchart form in accordance with one embodiment of the invention. The process described herein is used to recursively adjust the TXFIR coefficients is assumed to be independent of the various adaptation algorithms used to adjust the AEQ and DFE coefficients in the receiver 114 (FIG. 1). Also in this embodiment, the TXFIR coefficients are adapted while the AEQ and DFE coefficients are held constant but might also adapt concurrently with the TXFIR coefficient adaptation process described above. In this embodiment, the controller 150 and the TX Adaptation unit 162 implements the described process. In other embodiments the described process can be implemented in another controller in the port 110.

With each assertion of TXFIR_REQUEST as described above and beginning with step 502, the adaptation loop gain value α, convergence window values (temporal length T and amplitude height H as explained in more detail below) are retrieved from a table in memory or the like as described in more detail regarding FIG. 4. The gain and window values might instead be calculated from the previously used values, e.g., the gain value might be set to one-half the previous gain value, and the window might have a smaller height and/or shorter length compared to the previous window as appropriate. Next, in step 504, the quality of the signal received by the receiver 114 (FIG. 1), e, is obtained from the receiver 114 by the TX Adaption unit 162. Then in step 506, the TXFIR coefficients are updated using α and e. How the coefficients are updated is explained herein. For purposes here, it is assumed that the AEQ and DFE coefficient taps are held constant during the TXFIR adaptation process, and the equivalent response of the channel, VGA, AEQ, and DFE can be described as:

$$H_{eq} = KHZ^{-L}, \quad \text{(Eq. 1)}$$

where K is the composite gain, H is the convolution of all impulse responses between the transmitter and the final output d, and $Z^{-L}$ is the total delay between the transmitter and output. The desired final output is delayed input might be represented as:

$$d = x \cdot Z^{-L}, \quad \text{(Eq. 2)}$$

where x is the signal applied to the TXFIR 254 from the serializer 252 (FIG. 2) and the error value is represented as:

$$e = d - y, \quad \text{(Eq. 3)}$$

where y is the output of the TXFIR filter 254 and can be additionally expressed as follows:

$$u = X^T \cdot H_{eq} \quad \text{(Eq. 4a)}$$

$$y = U^T \cdot W \quad \text{(Eq. 4b)}$$

where u is a bit (a decision bit) derived from time-aligning bits x with the output y as well as the error value e, $X^T$ is the vector of known data bits x that are transmitted during adaptation, and W is the vector of current transmitter FIR tap vector. Representing the samples at time k, we obtain $$X_k = [x_{k-0}, x_{k-1}, x_{k-2}] \quad \text{(Eq. 5)}$$

$$U_k = [u_{k-0}, u_{k-1}, u_{k-2}] \quad \text{(Eq. 6)}$$

and $$W_k = [w_{k-1}, w_{k-0}, w_{k+1}] \quad \text{(Eq. 7)}$$

The mean square error is represented as:

$$\epsilon = E[e_k^2] \quad \text{(Eq. 8)}$$

Where E[.] is the well-known expected value function. For the purpose of developing a recursive adaptive updates scheme for the transmitter coefficients, $e_k^2$ is used as an estimate for e. Thus at each iteration in the adaptation process the gradient estimate is of the form:

$$\nabla_k = \begin{bmatrix} \frac{de_k^2}{dw_{k-1}} \\ \frac{de_k^2}{dw_k} \\ \frac{de_k^2}{dw_{k+1}} \end{bmatrix} = 2e_k \begin{bmatrix} \frac{de_k}{dw_{k-1}} \\ \frac{de_k}{dw_k} \\ \frac{de_k}{dw_{k+1}} \end{bmatrix} = -2e_k U_k^T \quad \text{(Eq. 9)}$$

Thus the adaptive transmitter tap update algorithm can now be expressed as:

$$\begin{aligned} W_{k+1} &= W_k - \mu_n \nabla_k \quad \text{or} \\ W_{k+1} &= W_k + \alpha e_k U_k^T \end{aligned} \quad \text{(Eq. 10)}$$

Where n=1, 2, 3, . . . , and $\alpha = 2\mu_n$ is defined as the adaptation loop gain. In the event the receiver approximately equalizes the channel, then $U^T \cong X^T Z^{-L}$, where $Z^{-L}$ is delay needed to time-align (delay) data bits x generated by the receiver with the actual transmitted data bits presented to the TXFIR filter. Because the bits x presented to the TXFIR have a sequence or pattern known to the receiver during adaptation and the delay from the input to the TXFIR to the output bits y is also known to the receiver, the receiver constructs $X^T$ and $E^{-L}$ accordingly, effectively generating $U^T$, to generate the next set of TXFIR coefficients in accordance with Eq. 10. After the above-described decision-directed adaptation completes, then $X^T \cong Y^T$.

In one embodiment, the gradient defined in Eq. 9 is accumulated in an accumulator of length N. In another embodiment, there are three such accumulators, one for the pre-cursor coefficient, another for the post-cursor coefficient, and one for the main cursor coefficient. Before the gradient is accumulated, it is given a gain of $2^M$, where M is an integer $1 \leq M \leq N$ and, in one example, N equals thirteen. The accumulation continues for a time that the TXFIR_REQUEST signal (FIG. 3) is asserted. If during this time the accumulator overflows when greater than $2^N - 1$ or underflows when less than $-2^N$, then a corresponding UP or DOWN indication is generated to increase or decrease the transmitter pre-cursor or post-cursor coefficients. When the accumulator reaches a maximum value, then an UP indication or signal is generated, and when the accumulator falls below a minimum value, a DOWN indication or signal is produced. In one example, the maximum value might be $2^{23} - 1$, and the minimum value might be $-2^{23}$. In the aforementioned PCIe standard, the transmitter training period is limited to 24 ms. As a result to have reasonable number of updates to the TXFIR coefficients, it is desirable to limit the duration the TXFIR_REQUEST is asserted but with an increase the gain factor α. For SAS-3, 16GFC, or 802.3ap standards, the adaptation is longer, 500 ms, where the TXFIR_REQUEST duration can be extended and the adaptation gain can be reduced. This adaptation gain vs. accumulation time trade off can be programmed to meet the application need for increasing adaptation speed or to lower adaptation jitter noise.

Returning to FIG. 5, in step 508 the INHIBIT_TIMER is checked to see if it has timed out. If it has not, then the updated TXFIR coefficients are sent to the link partner TXFIR in step 510. Then in step 512 the TIMEOUT_TIMER is checked as a sanity check and, if the timer has not timed-out, control passes back to step 504. If, however, the TIMEOUT_TIMER has timed-out, then an error has occurred and the adaptation process terminated.

If the INHIBIT_TIMER has timed-out, then control from step 508 passes to step 514 where the TXFIR coefficients are checked to see if they have converged, in this embodiment and as explained above, the if the TXFIR coefficients stay within a range of amplitudes for a given time period that defines the window, then the adaptation process is considered converged for that adaptation gain value and window size set. If the coefficients are converged for the given window, then in step 516 the widow is checked to see if it is of minimum size and, if so, then the adaptation process is complete in step 518. If the coefficients have not converged, then control passes to step 520 and the adaptation loop gain a and the size of the window is decreased in step 518 by selecting the next gain/window size set as shown in FIG. 4, and control passes to step 510, described previously.

Returning to step 514, if the coefficients have not converged, then in step 522 if convergence occurred using a previous α and window size set, then the adaptation begins again using a larger gain α and bigger window selected in step 524 by selecting the previous gain/window size set as shown in FIG. 4 and described above regarding sub-period 315-1 in FIG. 3, and control passes to step 510, described previously. If, however, there was no earlier convergence, then control passes from step 522 to step 510 to continue adjustment of the coefficient values until convergence occurs.

While the above-described embodiments involve the adaptation of a transmit filter coefficients, the adaptation techniques described herein are also applicable to the adaption of coefficients for filters within a receiver, such as an equalizer or the like.

For purposes of this description and unless explicitly stated otherwise, each numerical value and range should be interpreted as being approximate as if the word "about" or "approximately" preceded the value of the value or range. Further, signals and corresponding nodes, ports, inputs, or outputs may be referred to by the same name and are interchangeable. Additionally, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements.

It is understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. In a port for receiving serialized data from a transmitter having a filter with at least one adjustable coefficient, the at least one adjustable coefficient having a value, the port comprising:
a receiver adapted to receive the filtered serialized data from the transmitter and generate decision bits and error values, the error values generated in response to the received filtered serialized data, the decision bits being a delayed version of a known data pattern and time-aligned with the error values;
a controller coupled to the receiver; and
a back-channel transmitter coupled to the controller;
wherein the controller is adapted to:
a) receive the error values from the receiver;
b) adjust the value of the at least one coefficient by an amount based on an adaptation gain value, the decision bits, and the error values;
c) transmit the value of the at least one adjusted coefficient to the filter via the back-channel transmitter;
d) repeat steps a) through c) for a first time period using a first adaptation gain value until changes in the at least one coefficient adjusted in step b) is less than a first threshold amount; and then
e) repeat steps a) through c) for a second time period using a second adaptation gain value that is less than the first adaptation gain value until changes in the value of the at least one coefficient adjusted in step b) is less than a second threshold amount, the second threshold amount being less than the first threshold amount.

2. The port of claim 1 wherein the controller includes a timeout timer that terminates execution of steps a) through e) if the timeout timer times out before step e) is completed.

3. The port of claim 1 wherein the controller includes an inhibit tinier and that the controller, before executing step d), repeatedly executes steps a) through c) using the first adaptation gain value until the inhibit timer times out.

4. The port of claim 1 wherein the error values represent the quality of the received filtered serialized data.

5. The port of claim 1 wherein the back-channel transmitter comprises a framer and a serializer, and the framer is adapted to receive the at least one adjusted coefficient from the controller for transmission by the serializer to the filter.

6. The port of claim 1 wherein the filter is a Finite Impulse Response filter.

7. The port of claim 1 wherein the receiver comprises at least one equalizer that adapts to the received filtered serialized data from the transmitter.

8. The port of claim 7 wherein the at least one equalizer adapts to the received filtered serialized data before steps a) through e) are executed.

9. The port of claim 1 wherein the controller terminates execution of steps a) through e) if the value of the at least one coefficient is outside a desired range of values.

10. The port of claim 1 wherein the port is a PCIe port and the second time period is shorter than the first time period.

11. The port of claim 1 wherein the value of the at least one coefficient is adjusted in step b) by an amount approximately equal to $\alpha e_k U_k^T$, where $\alpha$ is the adaptation gain value, $U^T$ is a vector formed from the decision bits, and $e_k$ is one of the error values.

12. A method comprising:
a) generating serialized data having a known data pattern;
b) filtering the serialized data using a filter having at least one adjustable coefficient;
c) coupling the filtered serialized data to a first communication channel;
d) receiving the filtered serialized data from the channel by a receiver;
e) generating in the receiver decision bits and error values, the error values generated in response to the received filtered serialized data, the decision bits being a delayed version of a known data pattern and time-aligned with the error values;
f) adjusting a value of the at least one adjustable coefficient by an amount that is a function of the error values, the decision bits, and an adaptation gain value;
g) transmitting the value of the at least one adjusted coefficient to the filter via a second communication channel;
h) repeating steps a) through g) for a first time period and using in step f) a first adaptation gain value until changes in the at least one adjustable coefficient in step f) is less than a first threshold amount; and then
i) repeating steps a) through g) for a second time period and using in step f) a second adaptation gain value that is less than the first adaptation gain value until changes in the at least one adjustable coefficient in step f) is less than a second threshold amount, the second threshold amount being less than the first threshold amount.

13. The method of claim 12 further comprising a step before step a) that initiates a timeout timer and wherein execution of steps a) through i) are terminated if the timeout timer times out before step i) is completed.

14. The method of claim 12 further comprising the step of; terminating the execution of steps a) through i) if the value of the at least one coefficient is outside a desired range of values after step f).

15. The method of claim 12 wherein the second time period is shorter than the first time period.

16. The method of claim 12 wherein the error values represent the quality of the received filtered serialized data.

17. The method of claim 12 further comprising a step before step a) that initiates an inhibit timer and further comprising a step, before step h), of repeating steps a) through g) using the first adaptation gain value until the inhibit timer times out.

18. The method of claim 12 wherein the second communication channel is a back-channel.

19. The method of claim 12 further comprising after step i) a step of repeating steps a) through g) for the first time period and using in step f) the first adaptation gain value if, in step i), the adjustment in the at least one adjustable coefficient in step f) exceeds the second threshold amount during the second time period.

20. The method of claim 12 wherein step comprises the steps of:
   f1) generating at least one gradient that is a function of the error values, the decision bits, and the first or second adaptation gain values;
   f2) accumulating the at least one gradient;
   f3) generating a first signal if the accumulated at least one gradient is greater than a first threshold and generating a second signal if the accumulated at least one gradient is less than a second threshold value; and
   f4) adjusting the value of the at least one adjustable coefficient in response to the first signal and the second signal, the first signal and second signal respectively increasing and decreasing the value of the at least one adjustable coefficient.

21. The method of claim 12 wherein the value of the at least one coefficient is adjusted in step f) by an amount approximately equal to $\alpha e_k U_k^T$, where $\alpha$ is the adaptation gain value, $U^T$ is a vector formed from the decision bits, and $e_k$ is one of the error values.

22. A method comprising:
   a) generating a serialized data having a known data pattern;
   b) filtering the serialized data using a filter having at least one adjustable coefficient, the at least one coefficient having a value;
   c) coupling the filtered serialized data to a first communication channel;
   d) receiving the filtered serialized data from the channel by a receiver;
   e) generating in the receiver decision bits and error values, the error value generated in response to the received filtered serialized data, the decision bits corresponding to the serialized data and time-aligned with the error values;
   f) generating in the receiver at least one gradient that is a function of the error values, the decision bits, and an adaptation gain value;
   g) accumulating the at least one gradient;
   h) generating a first signal if the accumulated at least one gradient is greater than a first threshold and generating a second signal if the accumulated at least one gradient is less than a second threshold value;
   i) adjusting the value of the at least one adjustable coefficient in response to the first signal and the second signal, the first signal and second signal respectively increasing and decreasing the value of the at least one adjustable coefficient;
   j) transmitting the value of the at least one adjusted coefficient to the filter via a second communication channel;
   k) accumulating the first signal and the second signal;
   l) repeating steps a) through k) using in step f) a first adaptation gain value until the accumulated first and second signals in step k) is less than a first threshold amount at the end of a first time period; and then
   m) repeating steps a) through k) using in step f) a second adaptation gain value that is less than the first adaptation gain value until the accumulated first and second signals in step k) is less than a second threshold amount at the end of a second time period, the second threshold amount being less than the first threshold amount.

23. The method of claim 22 further comprising a step before step a) that initiates a timeout timer and wherein execution of steps a) through m) are terminated if the timeout timer times out before step m) is completed.

24. The method of claim 22 further comprising the step of: terminating the execution of steps a) through k) if the value of the at least one coefficient is outside a desired range of values after step i).

25. The method of claim 22 wherein the second time period is shorter than the first time period.

26. The method of claim 22, wherein the error values represent the quality of the received filtered serialized data.

27. The method of claim 22 further comprising a step before step a) that initiates an inhibit timer and wherein before step l), steps a) through k) are repeated using the first adaptation gain value until the inhibit timer times out.

28. The method of claim 22 wherein the second communication channel is a back-channel.

29. The method of claim 22 further comprising after step m) a step of repeating steps a) through k) for the first time period and using in step f) the first adaptation gain value if; in step m), the adjustment in the at least one adjustable coefficient in step f) exceeds the second amount during the second time period.

30. The method of claim 22 wherein the decision bits are a delayed version of the known data pattern.

31. The method of claim 22 wherein the value of the at least one coefficient is adjusted in step i) by an amount approximately equal to $\alpha e_k U_k^T$, where $\alpha$ is the adaptation gain value, $U^T$ is a vector formed from the decision bits, and $e_k$ is one of the error values.

32. In a port for receiving serialized data from a transmitter, the port comprising:
   a filter with at least one adjustable coefficient adapted to receive and filter the serialized data from the transmitter, the at least one adjustable coefficient having a value;
   a receiver adapted to receive the filtered serialized data and generate decision bits and error values, the error values generated in response to the received filtered serialized data, the decision bits corresponding to the serialized data and time-aligned with the error values; and
   a controller coupled to the receiver;
   wherein the controller is adapted to:
      a) receive the error values from the receiver;
      b) adjust the value of the at least one coefficient by an amount based on an adaptation gain value, the decision bits, and the error values;

c) transmit the value of the at least one adjusted coefficient to the filter;

d) repeat steps a) through c) for a first time period using a first adaptation gain value until changes in the at least one coefficient adjusted in step b) is less than a first threshold amount; and then e) repeat steps a) through c) for a second time period using a second adaptation gain value that is less than the first adaptation gain value until changes in the value of the at least one coefficient adjusted in step b) is less than a second threshold amount, the second threshold amount being less than the first threshold amount.

33. The port of claim 32 wherein the controller is further adapted to implement a timeout timer that terminates execution of steps a) through e) if the timeout timer times out before step e) is completed.

34. The port of claim 32 wherein the controller includes an inhibit timer and that the controller, before executing step d), repeatedly executes steps a) through c) using the first adaptation gain value until the inhibit timer times out.

35. The port of claim 32 wherein the error values represent the quality of the received filtered serialized data.

36. The port of claim 32 wherein the filter is an Finite Impulse Response equalizer.

37. The port of claim 32 wherein the controller terminates execution of steps a) through e) if the value of the at least one coefficient is outside a desired range of values.

38. The port of claim 32 wherein the second time period is shorter than the first time period.

39. The port of claim 32 wherein the value of the at least one coefficient is adjusted in step b) by an amount approximately equal to $\alpha e_k U_k^T$, where $\alpha$ is the adaptation gain value, $U^T$ is a vector formed from the decision bits, and $e_k$ is one of the error values.

40. An apparatus comprising:

a filter adapted to receive serialized data from a transmitter, the filter having at least one adjustable coefficient, the at least one adjustable coefficient having a value;

a receiver adapted to receive the filtered serialized data from the filter and generate decision bits and error values, the decision bits corresponding to the serialized data and time-aligned with the error values, the error values generated in response to the received serialized data;

a controller coupled to the receiver; and a back-channel transmitter coupled to the controller;

wherein the controller is adapted to:

a) receive the error values from the receiver;

b) adjust the value of the at least one coefficient by an amount based on an adaptation gain value, the decision bits, and the error values;

c) transmit the value of the at least one adjusted coefficient to the filter;

d) repeat steps a) through c) for a first time period using a first adaptation gain value until changes in the at least one coefficient adjusted in step b) is less than a first threshold amount; and then e) repeat steps a) through c) for a second time period using a second adaptation gain value that is less than the first adaptation gain value until changes in the value of the at least one coefficient adjusted in step b) is less than a second threshold amount, the second threshold amount being less than the first threshold amount.

41. The apparatus of claim 40 wherein the controller includes a timeout timer that terminates execution of steps a) through e) if the timeout diner times out before step e) is completed.

42. The apparatus of claim 40 wherein the controller includes an inhibit timer and that the controller, before executing step d), repeatedly executes steps a) through c) using the first adaptation gain value until the inhibit timer times out.

43. The apparatus of claim 40 wherein the error values represent the quality of the received filtered serialized data.

44. The apparatus of claim 43 wherein error values represent a difference between the equalized serialized data and the equalized serialized data decoded by the receiver.

45. The apparatus of claim 40 wherein the filter is a Finite Impulse Response equalizer.

46. The port of claim 40 wherein the controller terminates execution of steps a) through e) if the value of the at least one coefficient is outside a desired range of values.

47. The port of claim 40 wherein the value of the at least one coefficient is adjusted in step b) by an amount approximately equal to $\alpha e_k U_k^T$, where $\alpha$ is the adaptation gain value, $U^T$ is a vector formed from the decision bits, and $e_k$ is one of the error values.

48. The port of claim 40 wherein the serialized data has a known data pattern and the decision bits are a delayed version of the known data pattern.

* * * * *